(12) United States Patent
Bi

(10) Patent No.: US 12,013,742 B2
(45) Date of Patent: Jun. 18, 2024

(54) DYNAMIC LOW POWER MODE

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/414,300

(22) PCT Filed: Apr. 28, 2021

(86) PCT No.: PCT/CN2021/090463
§ 371 (c)(1),
(2) Date: Nov. 3, 2022

(87) PCT Pub. No.: WO2022/226821
PCT Pub. Date: Nov. 3, 2022

(65) Prior Publication Data
US 2024/0012467 A1    Jan. 11, 2024

(51) Int. Cl.
*G06F 1/3234* (2019.01)
*G06F 1/3206* (2019.01)
*G06F 1/3228* (2019.01)
*G06F 1/3287* (2019.01)
*G06F 1/3296* (2019.01)

(52) U.S. Cl.
CPC .......... *G06F 1/3275* (2013.01); *G06F 1/3206* (2013.01); *G06F 1/3228* (2013.01); *G06F 1/3287* (2013.01); *G06F 1/3296* (2013.01)

(58) Field of Classification Search
CPC .... G06F 1/3296; G06F 1/3206; G06F 1/3228; G06F 1/3275; G06F 1/3287; Y02D 10/00
See application file for complete search history.

(56) References Cited

U.S. PATENT DOCUMENTS

2011/0246800 A1 * 10/2011 Accpadi ................ G06F 1/3228
713/322
2015/0067357 A1    3/2015 Arora et al.
(Continued)

OTHER PUBLICATIONS

International Search Report and Written Opinion received for PCT Patent Application No. PCT/CN2021/090463, mailed on Jan. 26, 2022, 9 pages.

*Primary Examiner* — Glenn A. Auve
(74) *Attorney, Agent, or Firm* — Holland & Hart LLP

(57) ABSTRACT

Methods, systems, and devices for dynamic low power mode are described. An apparatus may include a memory device and a controller. The controller may receive a command to transition from a first power state to a second power state, the first power state associated with executing received command and the second power state associated with deactivating one or more components of the memory device. The controller may execute, while in the first power state, a set of operations associated with the transition from the first power state to second power state. The controller may determine whether a duration to execute the set of operations satisfies a delay duration between receiving the command and transitioning to the second power state from the first power state. The controller may transition from the first power state to the second power state based on determining whether the duration satisfies the delay duration.

25 Claims, 6 Drawing Sheets

(56) References Cited

U.S. PATENT DOCUMENTS

| | | |
|---|---|---|
| 2015/0277528 A1 | 10/2015 | Knight et al. |
| 2019/0265774 A1 | 8/2019 | Tsien et al. |
| 2020/0310524 A1 | 10/2020 | Park et al. |
| 2021/0200299 A1* | 7/2021 | Liang .................... G06F 1/3225 |
| 2023/0350482 A1* | 11/2023 | Xiong .................... G06F 1/3225 |

* cited by examiner

DYNAMIC LOW POWER MODE

CROSS REFERENCE

The present Application for Patent is a 371 national phase filing of International Patent Application No. PCT/CN2021/090463 by BI, entitled "DYNAMIC LOW POWER MODE," filed Apr. 28, 2021, assigned to the assignee hereof, and expressly incorporated by reference herein.

FIELD OF TECHNOLOGY

The following relates generally to one or more systems for memory and more specifically to dynamic low power mode.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
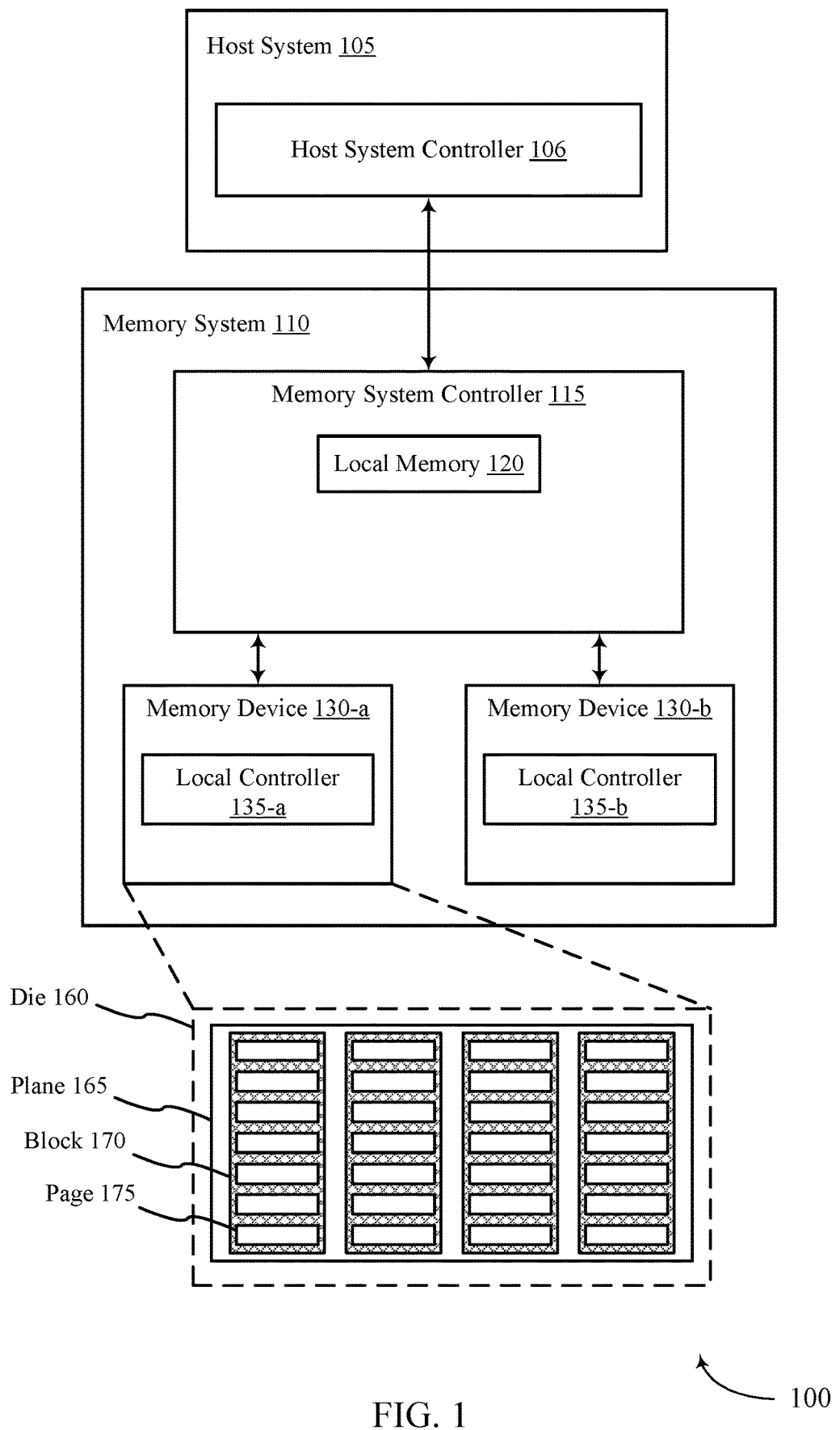
FIG. 1 illustrates an example of a system that supports dynamic low power mode in accordance with examples as disclosed herein.

A system may include a memory system and a host system coupled with the memory system. The host system may transmit commands to the memory system. In some examples, the memory system may be in a first power state—e.g., an active power state where the memory system may utilize a relatively high amount of power to execute operations received from the host system or background operations associated with the commands. Some host system have procedures to conserve power when the host system is not actively working—e.g., the host system may conserve power after not being active (e.g., being idle) for a duration. For example, the system may be battery-powered such that both the host system and the memory system are powered by a battery. In such systems, reducing power consumption in both the host system and the memory system may provide benefits to the user and extend the overall battery life of the system. To conserve power, the host system may transmit a hibernate command (e.g., hibernate request) to the memory system—e.g., a command indicating the memory system transition from the first power state to a second power state (e.g., low power mode) that consumes less power than the first power state. In response to the hibernate command, the memory system may perform operations (e.g., background operations associated with data maintenance) to prepare for the transition from the first power state to the second power state. After completing the operations, the memory system may transition to the second power state (e.g., enter low power mode).

In some examples, the host system may initiate a new operation while the memory system is in the second power state. In such examples, the host system may transmit a second command associated with the operation and a hibernate exit command—e.g., a command indicating the memory system transition from the second power state back to the first power state. In response to the hibernate exit command, the memory system may perform additional operations to prepare for the transition from the second power state to the first power state. After completing the operations, the memory system may transition to the first power state (e.g., the active state) and execute the operation associated with the second command. In some examples, the memory system may experience latency between receiving the second command and executing the second command based on exiting the low power mode. In some examples, the memory system may also consume a relatively large amount of power to transition from the second state to the first state. For example, the memory system may move information from volatile memory devices (e.g., static random access memory (SRAM), caches, or buffers) to non-volatile memory devices (e.g., NAND) in prepare to move to the second state, which may take power. In some examples, the host system may initiate the hibernate exit while the memory system is in the second power state for a relatively short duration—e.g., the host system may remain idle for a short duration. In such examples, the latency and power consumption to exit the second power state may outweigh the benefit of conserving power while the memory system is in the second power state. That is, exiting the second power state quickly (and or repeatedly) may cause the performance of the system to decrease.

Systems, techniques, and devices are described herein for a memory system to dynamically adjust a transition from a first power state (e.g., active power state) and a second power state (e.g., low power mode) to balance latency and power consumption. For example, the memory system may receive an enter hibernate command (e.g., transition from the first power state to the second power state) from the host system. In response to the command, the memory system may execute a set of operations associated with transitioning from the first power state to the second power state. After executing the set of operations, the memory system may determine if a duration to execute the set of operations satisfies a delay duration between receiving the hibernate command and transitioning to the second power state. In some examples, the delay duration may be based on a quantity of previous durations the host system remained idle—e.g., the duration between the enter hibernate command an exit hibernate time. If the memory system determines the duration to execute the set of operations satisfies the delay duration, the memory system may transition to the second power state. If the memory system determines the duration to execute the set of operations is less than the delay duration, the memory system may refrain from transitioning to the second power state until the delay duration expires. By utilizing the delay value, the memory system may reduce the likelihood of short hibernate durations—e.g., reduce the likelihood the memory system is in the low power mode for short durations. This may enable the memory system to conserve power and minimize latency associated with transitioning between the first power state and the second power state repeatedly.

Features of the disclosure are initially described in the context of systems, devices, and circuits with reference to FIG. 1. Features of the disclosure are described in the context of a flowchart, process flow, and timing diagram with reference to FIGS. 2-4. These and other features of the disclosure are further illustrated by and described in the context of an apparatus diagram and a flowchart that relate to dynamic low power mode with reference to FIGS. 5 and 6.

FIG. 1 illustrates an example of a system 100 that supports dynamic low power mode in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. In some examples, such operations may also be referred to as background operations. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support dynamic low power mode. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, the memory system 110 may receive an enter hibernate command from the host system 105—e.g., a command indicating the memory system transition from a first power state to a second power state, where the first power state is associated with executing operations and the second power state consumes less power than the first power state. In some examples, in response to the enter hibernate command, the memory system 110 may perform background operations to prepare to transition to the second power state. After completing the background operations, the memory system 110 may determine whether a duration to execute the background operations satisfies a delay duration between receiving the enter hibernate command and transitioning to the second power state. If the memory system 110 determines the duration does satisfy the delay duration, the memory system 110 may transition to the second power state. If the memory system 110 determines the duration does not satisfy the delay duration, the memory system 110 may refrain from transitioning to the second power state until the delay duration expires.

By waiting to transition to the second power state until the delay duration is satisfied, the memory system 110 may reduce a likelihood of being in the second power state for a relatively short duration. That is, the memory system 110 may reduce a risk of receiving an exit hibernate command from the host system 105 shortly after transitioning to the second power state. This may enable the memory system 110 to conserve power and reduce latencies associated with exiting the second power state shortly after the entering the second power state.

Figure 2:
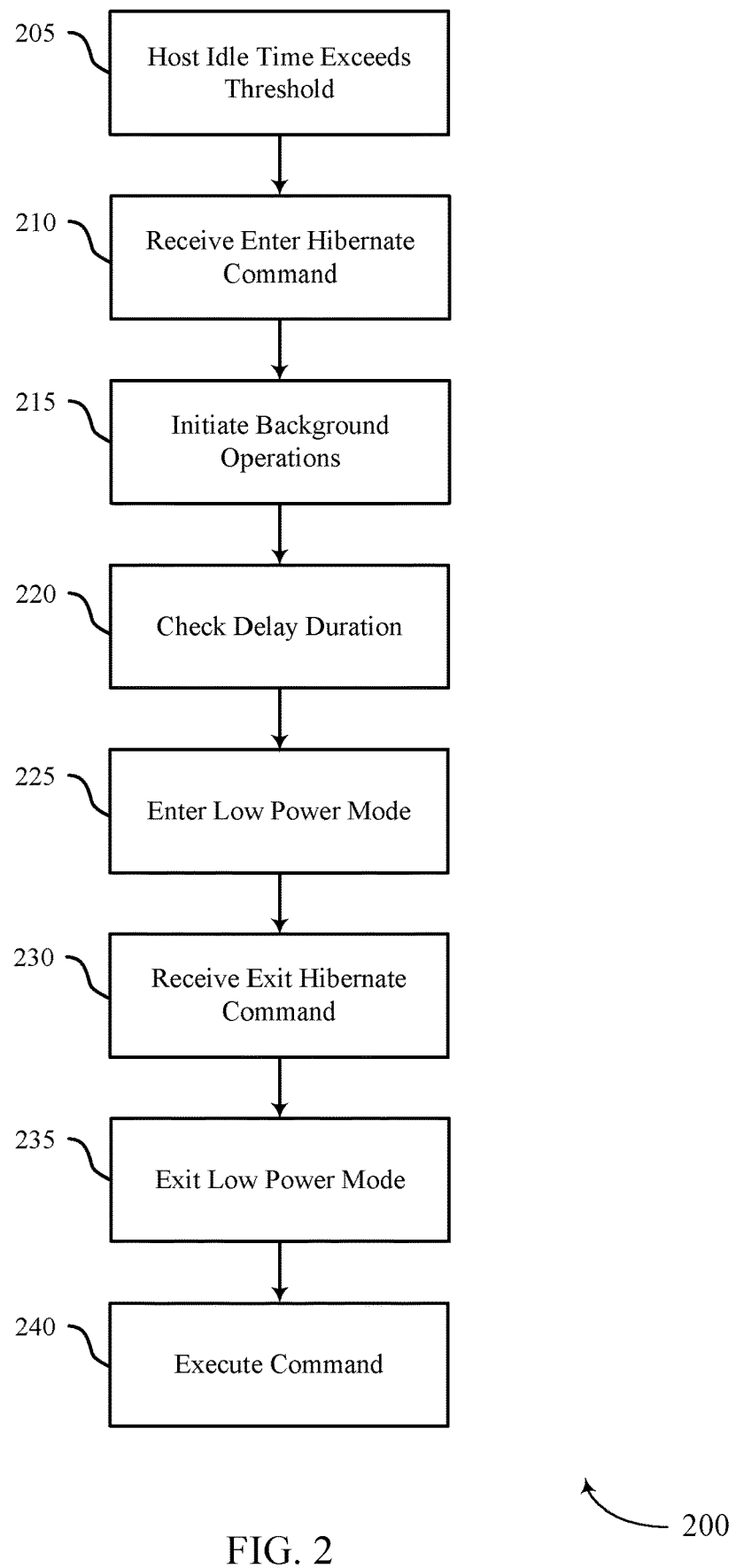
FIG. 2 illustrates an example of a process diagram that supports dynamic low power mode in accordance with examples as disclosed herein.

FIG. 2 illustrates an example of a process diagram 200 that supports dynamic low power mode in accordance with examples as disclosed herein. For example, the process diagram 200 may be performed by a system as described with reference to FIG. 1 (e.g., system 100, host system 105, and memory system 110 as described with reference to FIG. 1). Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process diagrams are possible. The process diagram 200 illustrates examples of a memory system dynamically adjusting a transition to a second power state based on receiving a enter hibernate command from the host system.

At 205, a host system idle time may exceed a threshold. For example, a host system (e.g., host system 105 as described with reference to FIG. 1) may determine its idle time exceeds a threshold. In some examples, the determination may be made at the host system controller 106. In some examples, a host system may enter an idle state when the host system is not performing any functions or tasks—e.g., the host system is not actively working. In some examples, the host system may remain in an idle state for a first duration. If the host system determines the first duration exceeds a threshold duration, the host system may enter a sleep mode. That is, the host system may transition to a power state that conserves less power based on being in an idle state. In some examples the threshold duration may be based on parameters of the host system—e.g., battery size, performance constraints, etc. In one example, the threshold duration may be 1.5 seconds (e.g., the host system may transition to the sleep mode if the host system is idle for more than 1.5 seconds). In some cases, the host system may also transmit an enter hibernate command to a memory system (e.g., memory system 110 as described with reference to FIG. 1).

At 210, an enter hibernate command may be received. For example, the memory system may receive the enter hibernate command from the host system. In some examples, the hibernate command may be received at a memory system controller (e.g., memory system controller 115 as described with reference to FIG. 1). In some examples, the host system may transmit the enter hibernate command to indicate to the memory system to transition from a first power state (e.g., an active state) to a second power state (e.g., a low power mode) while the host system is in the sleep mode. In some example, the first power state (e.g., active state) of the memory system may be associated with executing commands and performing operations for the host system. In other examples, the second power state (e.g., low power mode) may be associated with a power conservation state of the memory system—e.g., the memory system may consume less power in the low power mode. For example, the memory system may power down an SRAM component in the memory system controller to reduce power in the second state.

At 215, background operations may be initiated. For example, the memory system may initiate background operations. The background operations may be initiated by the memory system controller. In some examples, the memory system may refrain from perform some background operations when in an active mode in an effort to reduce a latency for performing commands received from the host system. When the memory system receives the enter hibernate command, that may be an indicator that the host system is not sending additional commands. Thus, background operations may be performed without adversely impacting the timing of executing commands from the host system. In some examples, the memory system may perform background operations to prepare to transition from the first power state to the second power state. For example, the memory system may perform garbage collection or transfer data from the memory system controller SRAM to a memory device (e.g., memory device 130 as described with reference to FIG. 1).

In some implementations, the process diagram 200 may not include step 220—e.g., the memory system may proceed from 215 to 225. In such examples, at 225 a low power mode may be entered. For example, the memory system may enter a low power mode. In some examples, after completing the background operations, the memory system may transition from the first power state to the second power state—e.g., the low power mode.

At 230, an exit hibernate command may be received. For example, the memory system may receive an exit hibernate command from the host system. The exit hibernate command may be received at the memory system controller. In some examples, the host system may exit the suspend to RAM mode (e.g., the sleep mode) and initiate a new command and operation for the memory system. In such examples, the host system may transmit the new command along with the exit hibernate command to indicate to the memory system to transition from the second power state to the first power state—e.g., to transition to the active state to execute the new command.

At 235, low power mode may be exited. For example, the memory system may exit low power mode—e.g., transition from the second power state to the first power state. In some examples, the memory system may perform a set of operations to transition from the second power state to first power state. For example, the memory system may transfer data from the memory device to the memory system controller SRAM. In other examples, the memory system may perform other data maintenance operations to transition from the second power state to the first power state. In some examples, the memory system may consume a relatively large amount of power to transition from the second power state to the first power state. In other examples, the memory system may cause the system latency to increase when transitioning from the second power state to the first power state—e.g., the memory system may take a duration to transition from the second power state to the first power state and take longer to initiate the second command when compare with being in the first power state.

At 240, a command may be executed. For example, the memory system may execute the new command received from the host system. The operation associated with the new command may be initiated by the memory system controller.

In some examples, the host system may be in the idle state for a relatively short duration. In some examples, the memory system may exit the low power mode relatively quickly based on the host system being idle for the short duration. In such examples, the memory system may consume more power transitioning from the second power state to the first power state than if the memory system had remained in the first power state throughout the short duration the host system was idle. Additionally, the memory system may increase the latency of the system by transitioning from the second power state to the first power state. Repeatedly transitioning from the second power state to the first power state when the host system is an idle state for the short duration may decrease the performance of the system.

The memory system may utilize a delay duration. In such examples, at 220 (e.g., before entering low power mode and after completing the background operations), a delay duration may be checked. For example, the memory system may check the delay duration. In some examples, the delay duration may be checked at the memory system controller. In some examples, the delay duration may be associated with a duration between receiving an enter hibernate command and entering low power mode. In some examples, the delay duration may be based on an average duration the memory system is in a hibernate state (e.g., the duration between receiving the enter hibernate command the exit hibernate command). In such examples, the memory system controller may check to see if the delay duration has expired before entering low power mode as described with reference to FIG. 3. By utilizing the delay duration, the memory system may reduce the likelihood of entering the low power mode for a relativity short duration. Accordingly, the memory system may conserve more power and reduce the latency of the system.

Figure 3:
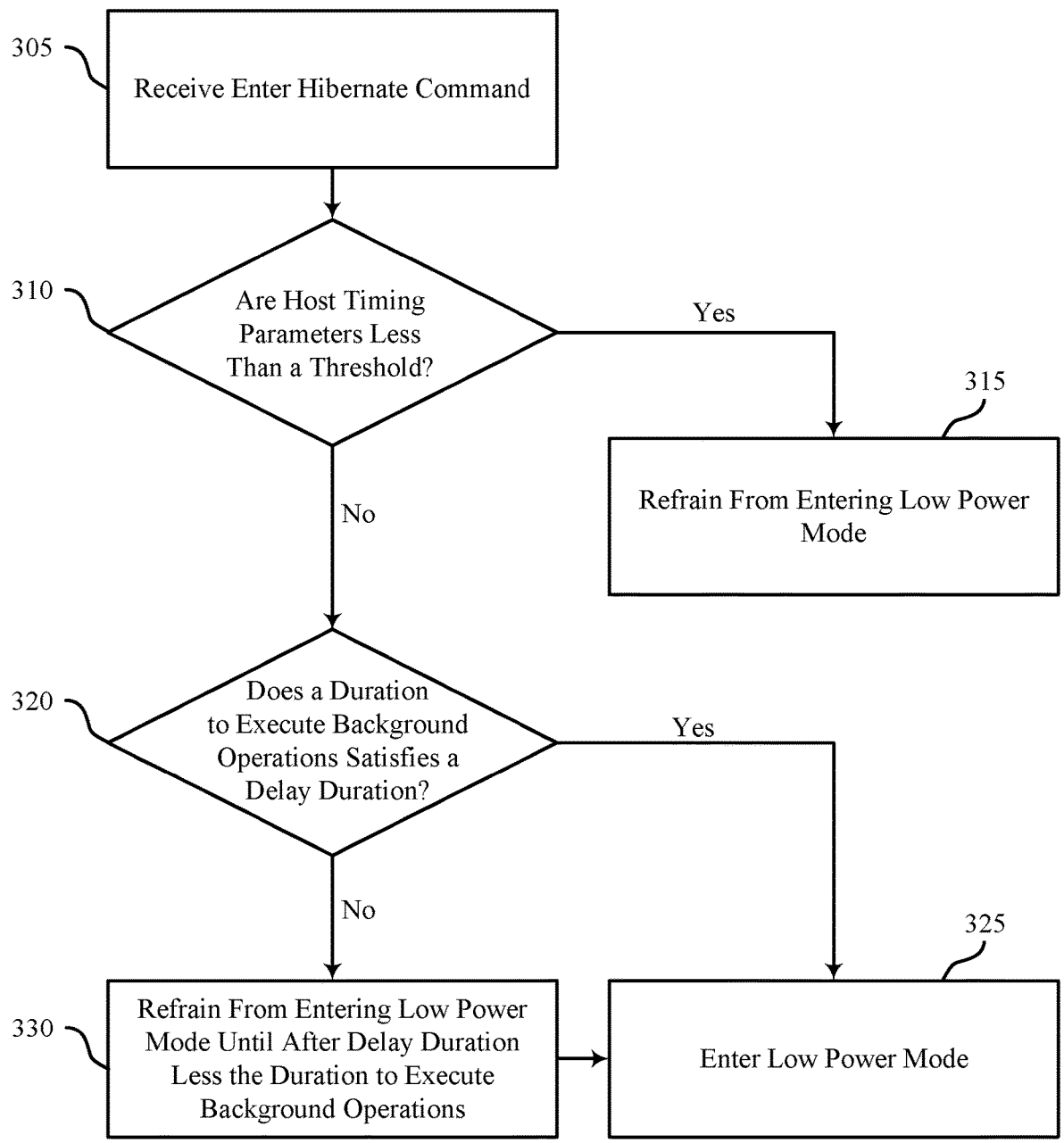
FIG. 3 illustrates an example of process diagram that supports dynamic low power mode in accordance with examples as disclosed herein.

FIG. 3 illustrates an example of a process diagram 300 that supports dynamic low power mode in accordance with examples as disclosed herein. For example, the process diagram 300 may be performed by a system as described with reference to FIG. 1 (e.g., system 100, host system 105, and memory system 110 as described with reference to FIG. 1). Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process diagrams are possible. The process diagram 300 illustrates examples of a memory system dynamically adjusting a transition to a second power state based on receiving a enter hibernate command from the host system and utilizing a delay duration.

At 305 an enter hibernate command may be received. For example, a memory system (e.g., memory system 110 as described with reference to FIG. 1) may receive the enter hibernate command from a host system (e.g., host system 105 as described with reference to FIG. 1). The enter hibernate command may be received at a memory system controller (e.g., memory system controller 115 as described with reference to FIG. 1). In some examples, the host system may transmit the enter hibernate command when the host system is in an idle state. The host system may transmit the enter hibernate command to transition the memory system from a first state (e.g., an active state) to a second state (e.g., a lower power mode) based on the host system being in an idle state. In some examples, in response to receiving the enter hibernate command, the memory system may initiate background operations to prepare for the transition from the first power state to the second power state—e.g., perform garbage collection operations or transferring data around in the memory system.

At 310, whether host timing parameters are less than a threshold may be determined. For example, the memory system may determine if host timing parameters are less than the threshold. The determination may happen at the memory system controller. In some examples, after completing the background operations, the memory system may compare host timing parameters with the threshold. In some examples, a host timing parameter may be a duration after which the host system will enter a suspend to RAM state (e.g., the threshold duration of the host system as described with reference to FIG. 1). In some examples, duration may be 1.5 seconds and be associated with a variable 'A.' In other examples, a host timing parameter may be associated with a duration after which the host system will transition performance modes (e.g., speed mode). For example, the host system may transition from a first performance mode to a second performance mode (e.g., a performance mode with lower power consumption like HSG1) if the workload is less than a threshold percentage—e.g., if the workload is less than five percent (5%). That is, the host system may transition from the first performance mode to the second performance mode if the host system is idle for 95% of a duration (e.g., idle for 57 ms in a 60 ms duration). In some examples, this host timing parameter may be associated with a variable 'B.' In some cases, the host timing parameter may be associated with a duration after which the host system will transmit the enter hibernate command. In some cases, this timing parameter may vary on the system attributes of the host system. For example, the duration may be 1 ms, 5 ms, 10 ms, or another value—e.g., the host system may transmit the enter hibernate command if its idle time exceeds 1 ms, 5 ms, 10 ms, or another value. This parameter may be associated with a variable 'C.'

In some examples, the memory system may compare the hosting timing parameters to a threshold value. In some cases, the threshold value may be a time threshold associated with a power consumption. For example, the threshold value may be associated with a duration in the second power state at which the memory system conserves more power than being in the first power state. That is, as described with reference to FIG. 2, in some examples, the memory system may consume additional power transitioning from the second power state to the first power state than remaining in the first power state through the duration of a host idle period. In such examples, the memory system may see a reduction in power consumption if the memory system remains in the second power state for a specific duration (e.g., the timing duration or benefit threshold). For example, the memory system may determine the threshold value with the following formula: System Active Power*Enter (or Exit)Low Power Mode Latency=Device Active Power*Threshold Value, where system active power is the power consumed by an entire system (e.g., system 100 as described with reference to FIG. 1), enter/exit low power mode latency is a duration the memory system takes to enter or exit low power mode, and the device active power is the power consumed by the memory system. For example, if the system power is 100 mW, the enter/exit latency is 2 ms, and the device active power is 10 ms, the threshold value (e.g., the benefit value) may be 20 ms. In that, the memory system may conserve power (e.g., see a power conservation benefit) if the memory system remains in the second power state (e.g., low power mode) for 20 ms or longer.

In some examples, the memory system may compare the host timing parameters with the threshold value utilizing the following equations: A−BKOPS−C<Threshold value and B−BKOPS−C<Threshold value, where BKOPS is a duration utilized by the memory system to complete the background operations. If the memory system determines that A−BKOPS−C or B−BKOPS−C is less than the threshold value, the memory system may proceed to block 315. If the memory system determines that A−BKOPS−C or B−BKOPS−C satisfies (e.g., is less than the threshold value), the memory system may proceed to block 320.

At 315, a low power mode may not be entered. For example, a memory system may refrain from entering low power mode. In some examples, the memory system may determine entering low power mode may consume more power (or increase the latency) than compared to remaining in a first power mode (e.g., the active state). For example, the memory system may determine this by utilizing the formula described with reference to block 310 and determining the host timing parameters are less than the threshold value. In such examples, to avoid the additional power consumption, the memory system may remain in the active state and refrain from transitioning to the low power mode.

At 320, whether a duration to execute background operations satisfies a delay duration is determined. For example, the memory system may determine if the duration to execute the background operations satisfies the delay duration. The determination may happen at the memory system controller. In some examples, the memory system may determine a delay duration—e.g., a duration between receiving an enter hibernate command and transitioning from the first power state to the second power state. In such examples, the memory system may transition to the second power state if the delay duration has been satisfied. In some examples, the memory system may determine the delay duration by looking at a previous quantity of times the memory system was in a hibernate state—e.g., a duration between receiving the enter hibernate command an exit hibernate command (e.g., an exit hibernate command as described with reference to FIG. 1). For example, the memory system may look at a last ten (10) times the memory system was in the hibernate state. In some examples, the memory system may determine an average duration of the hibernate states to determine the delay duration. In some cases, the memory system may determine a weighted average to determine the delay duration. For example, the memory system may determine respective subset of durations for each hibernate period as indicated in the table (e.g., Table 1) below.

may a possible example of how the memory system determines the delay duration, other possibilities may exist. In any example, the memory system may determine a delay duration to predict (e.g., forecast) a next hibernate duration. The memory system may utilize the delay value to reduce the likelihood of a relatively short duration in the second power state—e.g., to avoid consuming more power transitioning to the second power state and then back to the first power state in response to an exit hibernate request than remaining in the first power state.

After determining the delay duration, the memory system may determine if the duration to execute the background operations satisfies the delay duration. If the memory system determines the duration to execute the background operations satisfies the delay duration, the memory system may proceed to block 325. If the memory system determines the duration to execute the background operations does not satisfy the delay duration, the memory system may proceed to block 330.

TABLE 1

| Subset | S0 (0-5 ms) | S1 (5-10 ms) | S2 (10-15 ms) | S3 (15-20 ms) | S4 (20-25 ms) | S5 (25-30 ms) | S6 (30-35 ms) | S7 (35-40 ms) | Other |
|---|---|---|---|---|---|---|---|---|---|
| Associated Variable Quantity of times Observed | X0 | X1 | X2 | X3 | Y0 | Y1 | Y2 | Y3 | Y4 |

In some examples, the quantity of subsets in Table 1 may be (2*Threshold Value/5)+1. For example, if the threshold value is 20 ms, there may be nine subsets. The memory system may group the duration of each hibernate times over the last quantity of hibernate times based on the subsets. For example, the memory system may look at the last 10 hibernate times and determine a first hibernate time of 4 ms, second hibernate time of 6 ms, a third hibernate time 11 ms, and so forth until the tenth hibernate time. In such examples, the memory system may determine one value associated with X0, one with X1, one with X2 and so forth. Based on determining the quantity of values in each subset, the memory system may determine the weighted average based on the following table (e.g., Table 2) based on the threshold value being 20 ms.

TABLE 2

| Equation | Delay Duration |
|---|---|
| X0 > 20% | 5 ms |
| X0 + X1 > 40% | 10 ms |
| X0 + X1 + X2 > 60% | 15 ms |
| X0 + X1 + X2 + X3 > 80% | 20 ms |
| X0 + X1 + X2 + X3 > 40% AND Y0 + Y1 + Y2 + Y3 > 40% | 2*Threshold Value (e.g., 40 ms) |
| X0 + X1 + X2 + X3 > 30% AND Last Hibernate Average < Threshold Value | 20 ms |
| X0 + X1 + X2 + X3 < 30% Last Hibernate Average < 2*Threshold Value OR X0 + X1 + X2 + X3 < 20% AND Last Hibernate Average > Threshold Value OR X0 + X1 + X2 + X3 < 10% | 0 ms |
| All Other Possibilities | 2 ms |

In some examples, the last hibernate average may be a last hibernate average determined by the memory system—e.g., based on a weighted average of the hibernate duration over the last ten (10) hibernate enter and exit commands. Table 2

At 325, low power mode may be entered. For example, the memory system may enter low power mode. In some examples, if the memory system determines a duration to complete the background operations satisfies the delay duration (e.g., the duration to complete the background operations is greater than the delay duration), the memory system may enter low power mode.

At 330, low power mode may be entered after a second duration is satisfied. For example, the memory system may refrain from entering low power mode until the delay duration has expired. In some examples, the memory system may enter low power mode after a second duration that satisfies the delay duration in combination with the first duration (e.g., the duration to execute the background operations). In that, the memory system may wait to enter low power mode until the entire delay duration is expired as described with reference to FIG. 4. That is, the memory system may enter low power mode after executing the background operations or the delay duration is expired, whichever is later.

Figure 4:
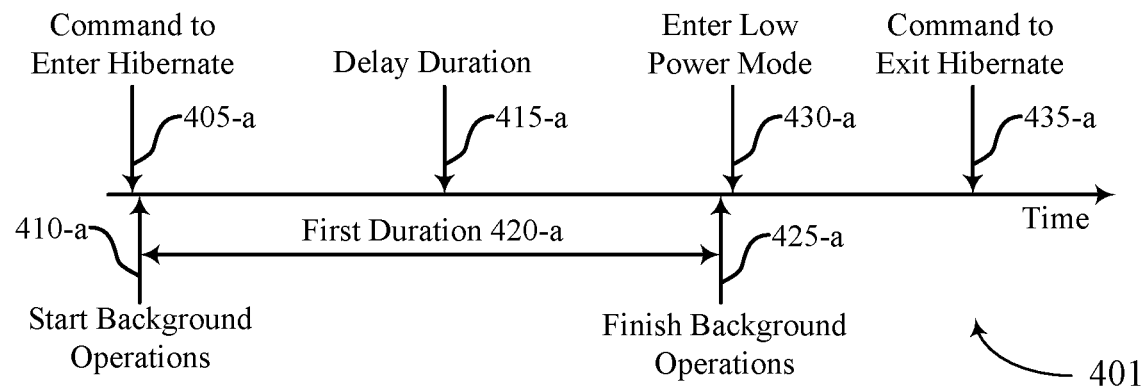
FIG. 4 illustrates an example of timing diagrams that support dynamic low power mode in accordance with examples as disclosed herein.
Figure 4:
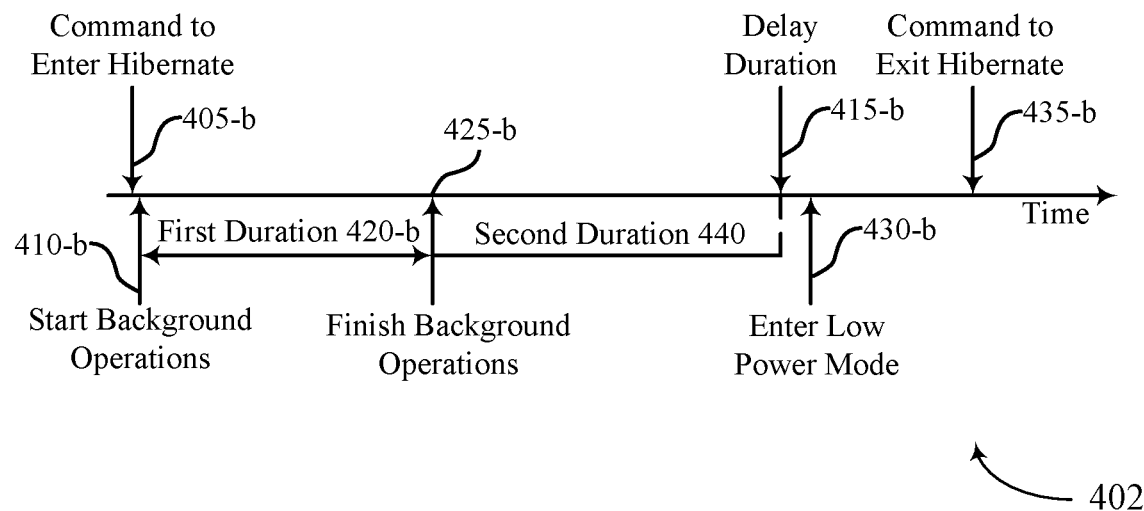
Figure 4:
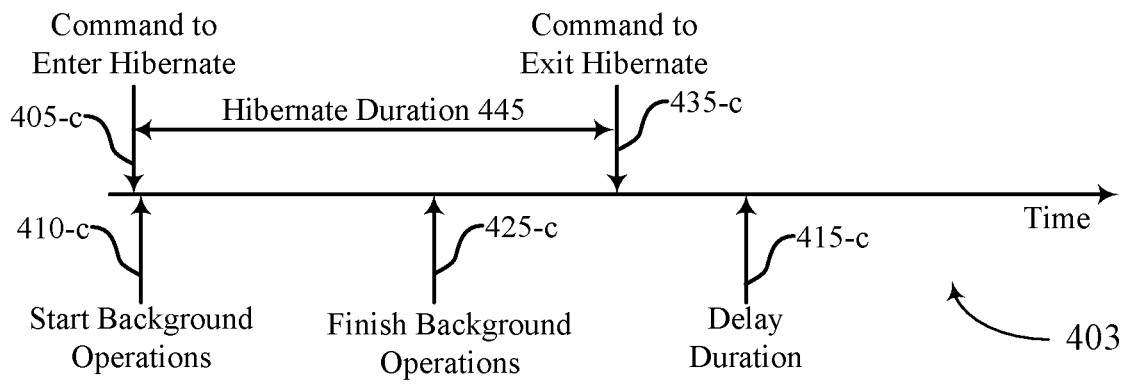

FIG. 4 illustrates an example of timing diagrams 401, 402, and 403 that support dynamic low power mode in accordance with examples as disclosed herein. For example, the timing diagrams 401, 402, and 403 may be performed by a system as described with reference to FIG. 1 (e.g., system 100, host system 105, and memory system 110 as described with reference to FIG. 1). Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process diagrams are possible. The timing diagrams 401, 402, and 403 illustrate examples of a memory system dynamically adjusting a transition to a second power state based on receiving a enter hibernate command from the host system and utilizing a delay duration. Timing diagrams 401, 402, and 403 may illustrate the timing of commands and operations performed by the memory system over time.

In some examples, timing diagram 401 may illustrate an example where a delay duration 415 is less than a duration to execute background operations as described with reference to FIG. 3 at block 320 and 325. For example, a memory system (e.g., memory system 110 as described with reference to FIG. 1) may receive a command to enter hibernate at 405-a from a host system (e.g., host system 105 as described with reference to FIG. 1). The memory system may start background operations at 410-a in response to receiving the enter hibernate command. In this example, the memory system may take a first duration 420-a to execute the background operations. Additionally, the first duration 420-a may exceed delay duration 415-a (e.g., delay duration as described with reference to FIG. 3). Accordingly, the memory system may finish the background operations at 425-a, a time after delay duration 415-a expires or is satisfied. The memory system may enter low power mode at 430-a based on completing the background operations. In some examples, the memory system may also receive a command to exit hibernate at 435-a.

In some examples, timing diagram 402 may illustrate an example where a delay duration 415 exceeds a duration to execute background operations as described with reference to FIG. 3 and block 320 and 330. For example, memory system may receive a command to enter hibernate at 405-b from a host system. The memory system may start background operations at 410-b in response to receiving the enter hibernate command. In this example, the memory system may take a first duration 420-b to execute the background operations. In some examples, the memory system may complete the background operations at 425-b before the delay duration 415-b is satisfied. In such examples, the memory system may wait until after a second duration 440 is satisfied before entering low power mode. That is, the memory system may wait a delay duration 415b—the first duration 420b (e.g., the second duration 440) before transitioning to the low power mode at 430-b after the delay duration 415-b is satisfied. In some examples, the memory system may also receive a command to exit hibernate at 435-b.

In some examples, timing diagram 403 may illustrate an example where a delay duration 415 exceeds a hibernate duration 445. For example, memory system may receive a command to enter hibernate at 405-c from a host system. The memory system may start background operations at 410-c in response to receiving the enter hibernate command. In this example, the memory system may finish the background operations at 425-c, before delay duration 415-c is satisfied (e.g., expires). Additionally, the memory system may receive a command to exit hibernate at 435-c after a hibernate duration 445. In this example, the hibernate duration 445 may be less than the delay duration 415-c—e.g., the memory system may receive a command to exit hibernate before transitioning from the first power state to the second power state. Accordingly, the memory system may reduce extra latency and power consumption by avoiding transitioning to the second power state after finishing the background operations and then immediately exiting low power mode after receiving the exit hibernate command. In such examples, the memory system may gain a benefit by not transitioning—e.g., a benefit, a one-time benefit, a power conservation parameter.

In some examples, the memory system may adjust the delay duration 415 based on determining whether the memory system gained a total benefit from utilizing the delay duration 415. For example, the memory system may determine if a hibernate duration 445 satisfies the delay duration 415. If the memory system determines the hibernate duration 445 is less than delay duration 415, the memory system may determine a one-time benefit with the equation: Threshold Value−Hiberante Druratoin 445, where the threshold value is a threshold value described with reference to FIG. 3 (e.g., the timing threshold or benefit threshold). That is, the memory system may conserve power when the delay duration 415 is greater than the hibernate duration 445 as described with reference to timing diagram 403. If the memory system determines the hibernate duration 445 does not satisfy the delay duration (e.g., is greater than the delay duration), the memory system have a one-time benefit–delay duration 415 (e.g., inversely related to the delay duration 415). That is, the memory system may experience increased power consumption and latency when the delay duration is less than the hibernate duration 445.

The memory system may also determine the total benefit gained from implementing delay value 415—e.g., an indication of a power conservation associated with implementing the delay duration. In some examples, the power conservation associated with implementing the delay duration may be associated with an amount of time conserved refraining from transitioning from the first power state to the second power state and back to the first power state in a relatively short amount of time as described with reference to FIG. 2. For example, the total benefit gained may be equal to benefit from delay duration 415+one−time benefit, where the benefit from delay duration may be an average power conservation parameter associated with the previous durations the memory system was in the hibernate state. For example, the average power conservation parameter may be total time or power the memory system conserved over the previous ten (10) hibernate durations 445—e.g., the previous ten (10) times the memory system received an enter hibernate command. If the memory system determines this total benefit is less than zero (e.g., there is no benefit and the memory system is using more power) the memory system may adjust the delay duration 415.

In some examples, the memory system may adjust the delay duration 415 by adjusting a previous quantity of durations used to determine the delay duration 415 from a first value to a second value. For example, as described with reference to FIG. 3, the memory system may determine the delay duration 415 over a previous ten (10) hibernate durations 445. If the memory system determines there is no power conserved over the previous ten (10) hibernate durations 445, the memory system may increase the quantity by five (5)—e.g., the memory system may determine a second delay duration 415 by looking at the last fifteen (15) hibernate durations 445 rather than the last ten (10). The memory system may then determine if there is any benefit from the second delay duration 415. If the memory system determines there is no power conserved over the last fifteen (15) hibernate durations 445, the memory system may increase the quantity again by five (5) to determine a third delay duration 415. It should be noted the quantity five (5) is used as an example only and other quantities may be used, for example, the memory system may increase the quantity of previous hibernate durations 445 by 1, 2, 3, 4, 6, 7, 8, 9, 10, or more.

In some examples, the memory system may reach a threshold quantity of hibernate durations 445 it may process to determine the delay duration 415. For example, the memory system may no longer adjust the quantity of delay durations 415 by five (5) when it reaches the threshold quantity—e.g., the memory system may look at no more than 40 previous hibernate durations 445. In some examples, the threshold quantity may depend on the attributes of the memory system—e.g., it may be memory system specific and may be more than or less than 40. If the memory system determines there is no power conservation at the threshold quantity of hibernate durations 445, the memory system may cease to use the delay duration—e.g., the memory system may transition directly from the first power state to the second power states when the background operations are completed. In some examples, the memory system may reset the quantity of hibernate durations 445 utilized to determine the delay duration 415 after the memory system receives a start stop unit (SSU) command from the host system For example, the memory system may reset the quantity of hibernate durations 445 utilized to determine the delay duration 415 to five each time the memory system receives the SSU command.

Figure 5:
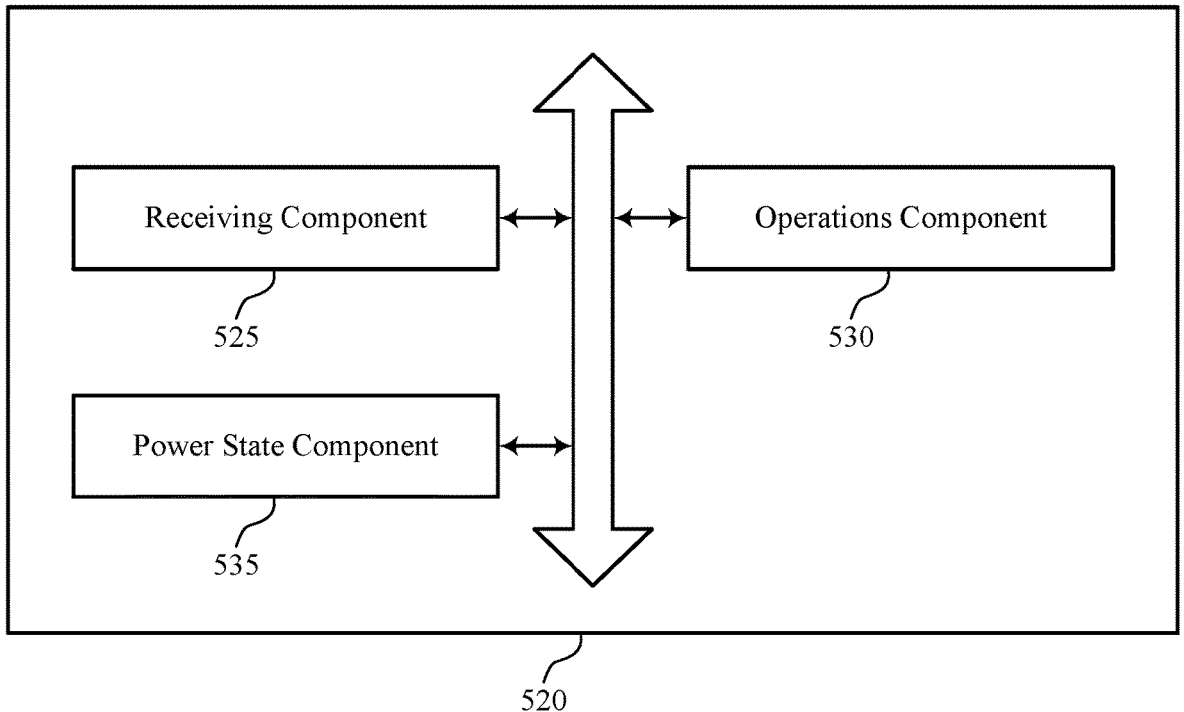
FIG. 5 shows a block diagram of a memory system that supports dynamic low power mode in accordance with examples as disclosed herein.

FIG. 5 shows a block diagram 500 of a memory system 520 that supports dynamic low power mode in accordance with examples as disclosed herein. The memory system 520 may be an example of aspects of a memory system as described with reference to FIGS. 1 through 4. The memory system 520, or various components thereof, may be an example of means for performing various aspects of dynamic low power mode as described herein. For example, the memory system 520 may include a receiving component 525, an operations component 530, a power state component 535, or any combination thereof. Each of these components may communicate, directly or indirectly, with one another (e.g., via one or more buses).

The receiving component 525 may be configured as or otherwise support a means for receiving a command to transition from a first power state to a second power state, the first power state associated with executing received commands and the second power state associated with deactivating one or more components associated with a memory array. In some examples, the receiving component 525 may be configured as or otherwise support a means for receiving a second command to transition from the second power state to the first power state based at least in part on transitioning from the first power state to the second power state.

The operations component 530 may be configured as or otherwise support a means for executing, while operating in the first power state, a plurality of operations associated with the transition from the first power state to the second power state based at least in part on receiving the command. In some examples, the operations component 530 may be configured as or otherwise support a means for determining whether a duration to execute the plurality of operations satisfies a delay duration between receiving the command and transitioning to the second power state from the first power state based at least in part on executing the plurality of operations. In some cases, the operations component 530 may be configured as or otherwise support a means for determining that the duration to execute the plurality of operations is greater than the delay duration, where transitioning to the second power state is based at least in part on determining that the duration is greater than the delay duration. In some instances, the operations component 530 may be configured as or otherwise support a means for determining that the duration to execute the plurality of operations is less than the delay duration. In some examples, the power state component 535 may be configured as or otherwise support a means for refraining from transitioning to the second power state after the duration based at least in part on determining that the duration is less than the delay duration.

In some examples, the operations component 530 may be configured as or otherwise support a means for determining that a second duration after the plurality of operations are complete and the duration combined are greater than the delay duration based at least in part on determining that the duration is less than the delay duration.

The power state component 535 may be configured as or otherwise support a means for transitioning from the first power state to the second power state based at least in part on determining whether the duration satisfies the delay duration. In some examples, the power state component 535 may be configured as or otherwise support a means for transitioning from the first power state to the second power state after the second duration based at least in part on determining that the second duration and the duration are greater than the delay duration. In some cases, the power state component 535 may be configured as or otherwise support a means for determining a plurality of second durations between receiving the command and receiving the second command to transition from the second power state to the first power state. In some examples, the power state component 535 may be configured as or otherwise support a means for determining an average duration between receiving the command and the second command based at least in part on the plurality of second durations, where the delay duration is based at least in part on the average duration. In some instances, the power state component 535 may be configured as or otherwise support a means for determining a respective subset of durations for each second duration of the plurality of second durations, where the average duration is based at least in part on a weighted average associated with a quantity of second durations in each respective subset.

In some examples, the power state component 535 may be configured as or otherwise support a means for determining a second duration between receiving the command and receiving the second command based at least in part on transitioning to the second power state. In some examples, the power state component 535 may be configured as or otherwise support a means for determining whether the second duration is greater than or less than the delay duration, where a second delay duration is based at least in part on determining whether the second duration is greater than or less than the delay duration. In some cases, the power state component 535 may be configured as or otherwise support a means for determining that the second duration is less than the delay duration. In some instances, the power state component 535 may be configured as or otherwise support a means for determining a difference between a time threshold associated with a power consumption and the second duration, where the difference is associated with a power conservation parameter.

In some cases, the power state component 535 may be configured as or otherwise support a means for determining that the second duration is greater than the delay duration, where the second delay duration is inversely related to a power conservation parameter. In some instances, the power state component 535 may be configured as or otherwise support a means for determining a power conservation parameter associated with a second duration between receiving the command and the second command. In some examples, the power state component 535 may be configured as or otherwise support a means for combining the power conservation parameter associated with the second duration with an average power conservation parameter associated with previous durations between receiving the command and the second command generate an indication of a power conservation associated with implementing the delay duration before transitioning to the second power state. In some cases, the power state component 535 may be configured as or otherwise support a means for determining that the indication of the power conservation associated with implementing the delay duration is less than a second threshold value that indicates whether the delay duration is causing the memory array to use more power. In some examples, the power state component 535 may be configured as or otherwise support a means for adjusting a quantity of the previous durations used to determine the delay duration from a first value to a second value greater than the first value based at least in part on determining the indication is less than the second threshold value.

In some examples, the power state component 535 may be configured as or otherwise support a means for determining that the second value is greater than a third threshold value based at least in part on adjusting to the second value. In some examples, the power state component 535 may be configured as or otherwise support a means for ceasing to use the delay duration when transitioning from the first power state to the second power state based at least in part on determining the second value satisfies the third threshold value.

Figure 6:
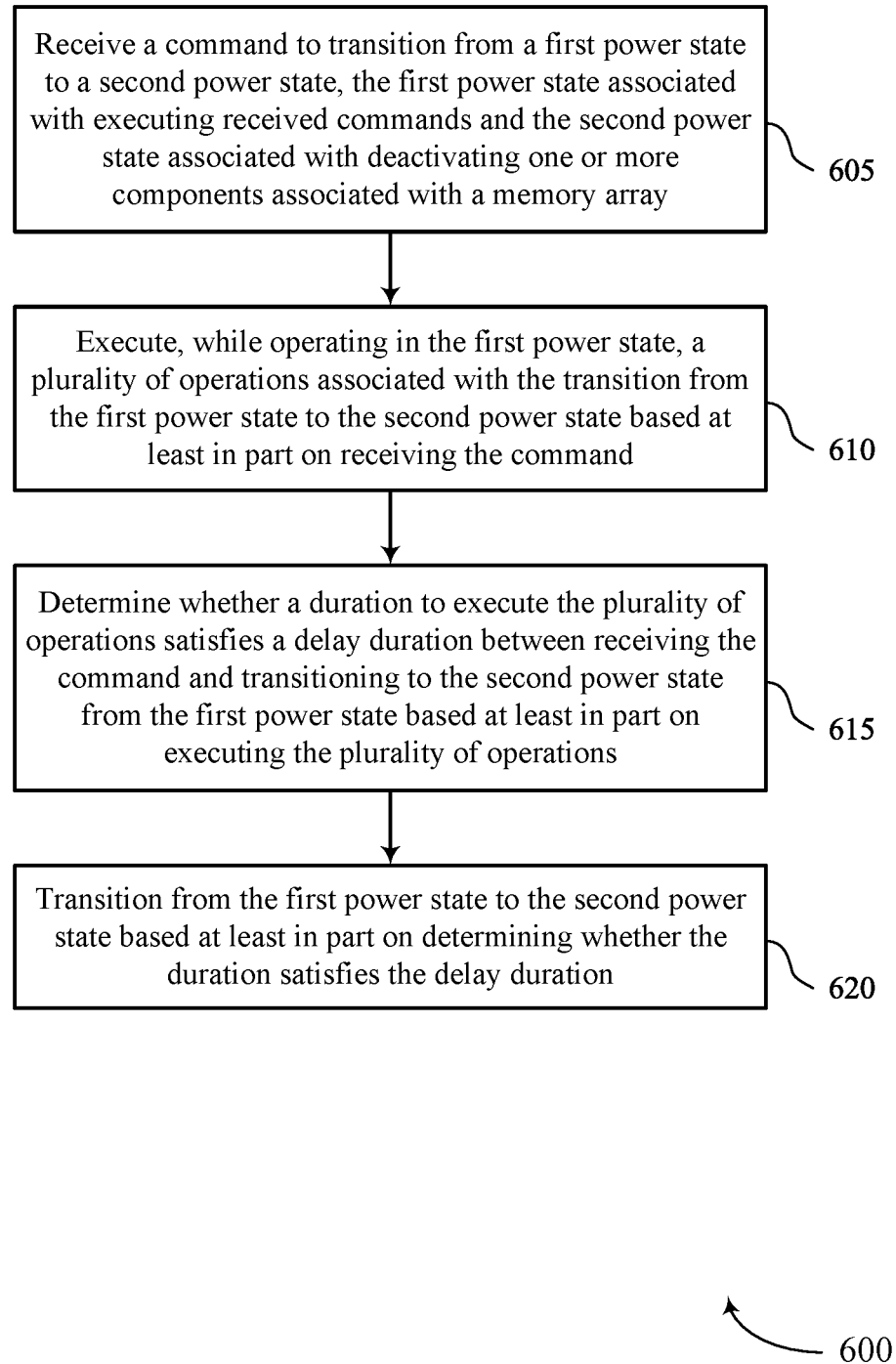
FIG. 6 shows a flowchart illustrating a method or methods that support dynamic low power mode in accordance with examples as disclosed herein.

FIG. 6 shows a flowchart illustrating a method 600 that supports dynamic low power mode in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a command to transition from a first power state to a second power state, the first power state associated with executing received commands and the second power state associated with deactivating one or more components associated with a memory array. The operations of 605 may be performed in accordance with examples as disclosed herein. In some examples, aspects of the operations of 605 may be performed by a receiving component 525 as described with reference to FIG. 5.

At 610, the method may include executing, while operating in the first power state, a plurality of operations associated with the transition from the first power state to the second power state based at least in part on receiving the command. The operations of 610 may be performed in accordance with examples as disclosed herein. In some examples, aspects of the operations of 610 may be performed by an operations component 530 as described with reference to FIG. 5.

At 615, the method may include determining whether a duration to execute the plurality of operations satisfies a delay duration between receiving the command and transitioning to the second power state from the first power state based at least in part on executing the plurality of operations. The operations of 615 may be performed in accordance with examples as disclosed herein. In some examples, aspects of the operations of 615 may be performed by an operations component 530 as described with reference to FIG. 5.

At 620, the method may include transitioning from the first power state to the second power state based at least in part on determining whether the duration satisfies the delay duration. The operations of 620 may be performed in accordance with examples as disclosed herein. In some examples, aspects of the operations of 620 may be performed by a power state component 535 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a command to transition from a first power state to a second power state, the first power state associated with executing received commands and the second power state associated with deactivating one or more components associated with a memory array, executing, while operating in the first power state, a plurality of operations associated with the transition from the first power state to the second power state based at least in part on receiving the command, determining whether a duration to execute the plurality of operations satisfies a delay duration between receiving the command and transitioning to the second power state from the first power state based at least in part on executing the plurality of operations, and transitioning from the first power state to the second power state based at least in part on determining whether the duration satisfies the delay duration.

Some cases of the method 600 and the apparatus described herein may further include operations, features, circuitry, logic, means, or instructions for determining that the duration to execute the plurality of operations may be greater than the delay duration, where transitioning to the second power state may be based at least in part on determining that the duration may be greater than the delay duration.

Some instances of the method 600 and the apparatus described herein may further include operations, features, circuitry, logic, means, or instructions for determining that the duration to execute the plurality of operations may be less than the delay duration and refraining from transitioning to the second power state after the duration based at least in part on determining that the duration may be less than the delay duration.

Some examples of the method 600 and the apparatus described herein may further include operations, features, circuitry, logic, means, or instructions for determining that a second duration after the plurality of operations may be complete and the duration combined may be greater than the delay duration based at least in part on determining that the duration may be less than the delay duration and transitioning from the first power state to the second power state after the second duration based at least in part on determining that the second duration and the duration may be greater than the delay duration.

Some cases of the method 600 and the apparatus described herein may further include operations, features, circuitry, logic, means, or instructions for receiving a second command to transition from the second power state to the first power state based at least in part on transitioning from the first power state to the second power state, determining a plurality of second durations between receiving the command and receiving the second command and determining an average duration the memory array maintains the second power state based at least in part on the plurality of second durations, where the delay duration may be based at least in part on the average duration.

In some instances of the method 600 and the apparatus described herein, and the method, apparatuses, and non-transitory computer-readable medium may include further operations, features, circuitry, logic, means, or instructions for determining a respective subset of durations for each second duration of the plurality of second durations, where the average duration may be based at least in part on a weighted average associated with a quantity of second durations in each respective subset.

Some cases of the method 600 and the apparatus described herein may further include operations, features, circuitry, logic, means, or instructions for receiving a second command to transition from the second power state to the first power state based at least in part on transitioning from the first power state to the second power state, determining a second duration between receiving the command and receiving the second command based at least in part on transitioning to the second power state and determining whether the second duration may be greater than or less than the delay duration, where a second delay duration may be based at least in part on determining whether the second duration may be greater than or less than the delay duration.

Some instances of the method 600 and the apparatus described herein may further include operations, features, circuitry, logic, means, or instructions for determining that the second duration may be less than the delay duration and determining a difference between a time threshold associated with a power consumption and the second duration, where the difference may be associated with a power conservation parameter.

Some cases of the method 600 and the apparatus described herein may further include operations, features, circuitry, logic, means, or instructions for determining that the second duration may be greater than the delay duration, where the second delay duration may be inversely related to a power conservation parameter.

Some instances of the method 600 and the apparatus described herein may further include operations, features, circuitry, logic, means, or instructions for receiving a second command to transition from the second power state to the first power state based at least in part on transitioning from the first power state to the second power state, determining a power conservation parameter associated with a second between receiving the command and the second command and combining the power conservation parameter associated with the second duration with an average power conservation parameter associated with previous durations between receiving the command and the second command to generate an indication of a power conservation associated with implementing the delay duration before transitioning to the second power state.

Some instances of the method 600 and the apparatus described herein may further include operations, features, circuitry, logic, means, or instructions for determining that the indication of the power conservation associated with implementing the delay duration may be less than a second threshold value that indicates whether the delay duration may be causing the memory array to use more power and adjusting a quantity of the previous durations used to determine the delay duration from a first value to a second value greater than the first value based at least in part on determining the indication may be less than the second threshold value.

Some cases of the method 600 and the apparatus described herein may further include operations, features, circuitry, logic, means, or instructions for determining that the second value may be greater than a third threshold value based at least in part on adjusting to the second value and ceasing to use the delay duration when transitioning from the first power state to the second power state based at least in part on determining the second value satisfies the third threshold value.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device, the controller configurable to cause the apparatus to receive a command to transition from a first power state to a second power state, the first power state associated with executing received commands and the second power state associated with deactivating one or more components associated with the memory device, execute, while operating in the first power state, a plurality of operations associated with the transition from the first power state to the second power state based at least in part on receiving the command, determine whether a duration to execute the plurality of operations satisfies a delay duration between receiving the command and transitioning to the second power state from the first power state based at least in part on executing the plurality of operations, and transition from the first power state to the second power state based at least in part on determining whether the duration satisfies the delay duration.

In some examples, the controller is further configurable to cause the apparatus to determine that the duration to execute the plurality of operations may be greater than the delay duration, where transitioning to the second power state may be based at least in part on determining that the duration may be greater than the delay duration.

In some cases, the controller is further configurable to cause the apparatus to determine that the duration to execute the plurality of operations may be less than the delay duration and refrain from transitioning to the second power state after the duration based at least in part on determining that the duration may be less than the delay duration.

In some instances, the controller is further configurable to cause the apparatus to determine that a second duration after the plurality of operations may be complete and the duration combined may be greater than the delay duration based at least in part on determining that the duration may be less than the delay duration and transition from the first power state to the second power state after the second duration based at least in part on determining that the second duration and the duration may be greater than the delay duration.

In some examples, the controller is further configurable to cause the apparatus to receive a second command to transition from the second power state to the first power state based at least in part on transitioning from the first power state to the second power state, determine a plurality of second durations between receiving the command and receiving the second command to transition from the second power state to the first power state and determine an average duration the apparatus maintains the second power state based at least in part on the plurality of second durations, where the delay duration may be based at least in part on the average duration.

In some cases, the controller is further configurable to cause the apparatus to determine a respective subset of durations for each second duration of the plurality of second durations, where the average duration may be based at least in part on a weighted average associated with a quantity of second durations in each respective subset.

In some instances, the controller is further configurable to cause the apparatus to receive a second command to transition from the second power state to the first power state based at least in part on transitioning from the first power state to the second power state, determine a second duration between receiving the command and receiving the second command and determine whether the second duration may be greater than or less than the delay duration, where a second delay duration may be based at least in part on determining whether the second duration may be greater than or less than the delay duration.

In some cases, the controller is further configurable to cause the apparatus to determine that the second duration may be less than the delay duration and determine a difference between a time threshold associated with a power consumption and the second duration, where the difference may be associated with a power conservation parameter.

In some examples, the controller is further configurable to cause the apparatus to determine that the second duration may be greater than the delay duration, where the second delay duration may be inversely related to a power conservation parameter.

In some instances, the controller is further configurable to cause the apparatus to receive a second command to transition from the second power state to the first power state based at least in part on transitioning from the first power state to the second power state, determine a power conservation parameter associated with a second duration between receiving the command and the second command and combine the power conservation parameter associated with the second duration with an average power conservation parameter associated with previous durations that the apparatus maintains the second power state to generate an indication of a power conservation associated with implementing the delay duration before transitioning to the second power state.

In some cases, the controller is further configurable to cause the apparatus to determine that the indication of the power conservation associated with implementing the delay duration may be less than a second threshold value that indicates whether the delay duration may be causing the apparatus to use more power and adjust a quantity of the previous durations used to determine the delay duration from a first value to a second value greater than the first value based at least in part on determining the indication may be less than the second threshold value.

In some instances, the controller is further configurable to cause the apparatus to determine that the second value may be greater than a third threshold value based at least in part on adjusting to the second value and cease to use the delay duration when transitioning from the first power state to the second power state based at least in part on determining the second value satisfies the third threshold value.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device, the controller configurable to cause the apparatus to:
   receive a command to transition from a first power state to a second power state, the first power state associated with executing received commands and the second power state associated with deactivating one or more components associated with the memory device;
   execute, while operating in the first power state, a plurality of operations associated with the transition from the first power state to the second power state based at least in part on receiving the command;
   determine whether a duration to execute the plurality of operations satisfies a delay duration between receiving the command and transitioning to the second power state from the first power state based at least in part on executing the plurality of operations; and
   transition from the first power state to the second power state based at least in part on determining whether the duration satisfies the delay duration.

2. The apparatus of claim 1, wherein the controller is further configurable to cause the apparatus to:
   determine that the duration to execute the plurality of operations is greater than the delay duration, wherein transitioning to the second power state is based at least in part on determining that the duration is greater than the delay duration.

3. The apparatus of claim 1, wherein the controller is further configurable to cause the apparatus to:
   determine that the duration to execute the plurality of operations is less than the delay duration; and
   refrain from transitioning to the second power state after the duration based at least in part on determining that the duration is less than the delay duration.

4. The apparatus of claim 3, wherein the controller is further configurable to cause the apparatus to:
   determine that a second duration after the plurality of operations are complete and the duration combined are greater than the delay duration based at least in part on determining that the duration is less than the delay duration; and
   transition from the first power state to the second power state after the second duration based at least in part on determining that the second duration and the duration are greater than the delay duration.

5. The apparatus of claim 1, wherein the controller is further configurable to cause the apparatus to:
   receive a second command to transition from the second power state to the first power state based at least in part on transitioning from the first power state to the second power state;
   determine a plurality of second durations between receiving the command and receiving the second command to transition from the second power state to the first power state; and
   determine an average duration between receiving the command and the second command based at least in part on the plurality of second durations, wherein the delay duration is based at least in part on the average duration.

6. The apparatus of claim 5, wherein to determine the average duration the controller is further configurable to cause the apparatus to:
   determine a respective subset of durations for each second duration of the plurality of second durations, wherein the average duration is based at least in part on a weighted average associated with a quantity of second durations in each respective subset.

7. The apparatus of claim 1, wherein the controller is further configurable to cause the apparatus to:
   receive a second command to transition from the second power state to the first power state based at least in part on transitioning from the first power state to the second power state;
   determine a second duration between receiving the command and receiving the second command; and
   determine whether the second duration is greater than or less than the delay duration, wherein a second delay duration is based at least in part on determining whether the second duration is greater than or less than the delay duration.

8. The apparatus of claim 7, wherein the controller is further configurable to cause the apparatus to:
   determine that the second duration is less than the delay duration; and
   determine a difference between a time threshold associated with a power consumption and the second duration, wherein the difference is associated with a power conservation parameter.

9. The apparatus of claim 7, wherein the controller is further configurable to cause the apparatus to:
   determine that the second duration is greater than the delay duration, wherein the second delay duration is inversely related to a power conservation parameter.

10. The apparatus of claim 1, wherein the controller is further configurable to cause the apparatus to:
    receive a second command to transition from the second power state to the first power state based at least in part on transitioning from the first power state to the second power state;
    determine a power conservation parameter associated with a second duration between receiving the command and the second command; and
    combine the power conservation parameter associated with the second duration with an average power conservation parameter associated with previous durations between receiving the command and the receiving the second command to generate an indication of a power conservation associated with implementing the delay duration before transitioning to the second power state.

11. The apparatus of claim 10, wherein the controller is further configurable to cause the apparatus to:
    determine that the indication of the power conservation associated with implementing the delay duration is less than a second threshold value that indicates whether the delay duration is causing the apparatus to use more power; and adjust a quantity of the previous durations used to determine the delay duration from a first value to a second value greater than the first value based at least in part on determining the indication is less than the second threshold value.

12. The apparatus of claim 11, wherein the controller is further configurable to cause the apparatus to:

determine that the second value is greater than a third threshold value based at least in part on adjusting to the second value; and cease to use the delay duration when transitioning from the first power state to the second power state based at least in part on determining the second value satisfies the third threshold value.

13. A non-transitory computer-readable medium storing code comprising instructions, which when executed by a processor of an electronic device, cause the electronic device to:

receive a command to transition from a first power state to a second power state, the first power state associated with executing received commands and the second power state associated with deactivating one or more components associated with a memory array;

execute, while operating in the first power state, a plurality of operations associated with the transition from the first power state to the second power state based at least in part on receiving the command;

determine whether a duration to execute the plurality of operations satisfies a delay duration between receiving the command and transitioning to the second power state from the first power state based at least in part on executing the plurality of operations; and transition from the first power state to the second power state based at least in part on determining whether the duration satisfies the delay duration.

14. The non-transitory computer-readable medium of claim 13, wherein the instructions, when executed by the processor of the electronic device, further cause the electronic device to determine that the duration to execute the plurality of operations is greater than the delay duration, wherein transitioning to the second power state is based at least in part on determining that the duration is greater than the delay duration.

15. The non-transitory computer-readable medium of claim 13, wherein the instructions, when executed by the processor of the electronic device, further cause the electronic device to:

determine that the duration to execute the plurality of operations is less than the delay duration; and refrain from transitioning to the second power state after the duration based at least in part on determining that the duration is less than the delay duration.

16. The non-transitory computer-readable medium of claim 15, wherein the instructions, when executed by the processor of the electronic device, further cause the electronic device to:

determine that a second duration after the plurality of operations are complete and the duration combined are greater than the delay duration based at least in part on determining that the duration is less than the delay duration; and transition from the first power state to the second power state after the second duration based at least in part on determining that the second duration and the duration are greater than the delay duration.

17. The non-transitory computer-readable medium of claim 13, wherein the instructions, when executed by the processor of the electronic device, further cause the electronic device to:

receive a second command to transition from the second power state to the first power state based at least in part on transitioning from the first power state to the second power state;

determine a plurality of second durations between receiving the command and receiving the second command to transition from the second power state to the first power state; and determine an average duration between receiving the command and the second command based at least in part on the plurality of second durations, wherein the delay duration is based at least in part on the average duration.

18. The non-transitory computer-readable medium of claim 17, wherein the instructions, when executed by the processor of the electronic device, further cause the electronic device to:

determine a respective subset of durations for each second duration of the plurality of second durations, wherein the average duration is based at least in part on a weighted average associated with a quantity of second durations in each respective subset.

19. The non-transitory computer-readable medium of claim 13, wherein the instructions, when executed by the processor of the electronic device, further cause the electronic device to:

receive a second command to transition from the second power state to the first power state based at least in part on transitioning from the first power state to the second power state;

determine a second duration between receiving the command and receiving the second command; and determine whether the second duration is greater than or less than the delay duration, wherein a second delay duration is based at least in part on determining whether the second duration is greater than or less than the delay duration.

20. The non-transitory computer-readable medium of claim 19, wherein the instructions, when executed by the processor of the electronic device, further cause the electronic device to:

determine that the second duration is less than the delay duration; and determine a difference between a time threshold associated with a power consumption and the second duration, wherein the difference is associated with a power conservation parameter.

21. The non-transitory computer-readable medium of claim 19, wherein the instructions, when executed by the processor of the electronic device, further cause the electronic device to determine that the second duration is greater than the delay duration, wherein the second delay duration is inversely related to a power conservation parameter.

22. A method, comprising:

receiving a command to transition from a first power state to a second power state, the first power state associated with executing received commands and the second power state associated with deactivating one or more components associated with a memory array;

executing, while operating in the first power state, a plurality of operations associated with the transition from the first power state to the second power state based at least in part on receiving the command;

determining whether a duration to execute the plurality of operations satisfies a delay duration between receiving the command and transitioning to the second power state from the first power state based at least in part on executing the plurality of operations; and transitioning from the first power state to the second power state based at least in part on determining whether the duration satisfies the delay duration.

23. The method of claim 22, further comprising:

determining that the duration to execute the plurality of operations is greater than the delay duration, wherein transitioning to the second power state is based at least in part on determining that the duration is greater than the delay duration.

24. The method of claim 22, further comprising:

determining that the duration to execute the plurality of operations is less than the delay duration; and refraining from transitioning to the second power state after the duration based at least in part on determining that the duration is less than the delay duration.

25. The method of claim 24, further comprising:

determining that a second duration after the plurality of operations are complete and the duration combined are greater than the delay duration based at least in part on determining that the duration is less than the delay duration; and transitioning from the first power state to the second power state after the second duration based at least in part on determining that the second duration and the duration are greater than the delay duration.

* * * * *